(12) United States Patent
Chen et al.

(10) Patent No.: US 11,359,638 B2
(45) Date of Patent: Jun. 14, 2022

(54) ALLOY ARTICLE, METHOD FOR MANUFACTURING SAID ALLOY ARTICLE, PRODUCT FORMED OF SAID ALLOY ARTICLE, AND FLUID MACHINE HAVING SAID PRODUCT

(71) Applicant: HITACHI METALS, LTD., Tokyo (JP)

(72) Inventors: Meichuan Chen, Tokyo (JP); Tadashi Fujieda, Tokyo (JP); Kousuke Kuwabara, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 313 days.

(21) Appl. No.: 16/636,516

(22) PCT Filed: Oct. 31, 2018

(86) PCT No.: PCT/JP2018/040474
§ 371 (c)(1),
(2) Date: Feb. 4, 2020

(87) PCT Pub. No.: WO2019/088158
PCT Pub. Date: May 9, 2019

(65) Prior Publication Data
US 2020/0158123 A1    May 21, 2020

(30) Foreign Application Priority Data
Oct. 31, 2017  (JP) .............................. JP2017-210364

(51) Int. Cl.
*F04D 29/02* (2006.01)
*B33Y 10/00* (2015.01)
(Continued)

(52) U.S. Cl.
CPC ............... *F04D 29/02* (2013.01); *B22F 3/24* (2013.01); *B22F 5/009* (2013.01); *B22F 9/082* (2013.01);
(Continued)

(58) Field of Classification Search
CPC ..................................................... C22C 30/00
See application file for complete search history.

(56) References Cited

U.S. PATENT DOCUMENTS

| 2008/0031769 A1 | 2/2008 | Yeh |
| 2016/0160323 A1 | 6/2016 | Harada et al. |
| 2018/0363104 A1 | 12/2018 | Fujieda et al. |
| 2019/0047049 A1 | 2/2019 | Fujieda et al. |

FOREIGN PATENT DOCUMENTS

| CN | 101130844 A | 2/2008 |
| JP | 2002-173732 A | 6/2002 |
| JP | 2018-145456 A | 9/2018 |

(Continued)

OTHER PUBLICATIONS

Fujieda, Tadashi, et al. "CoCrFeNiTi-based high-entropy alloy with superior tensile strength and corrosion resistance achieved by a combination of additive manufacturing using selective electron beam melting and solution treatment." Materials Letters 189 (2017): 148-151. (Year: 2017).*

(Continued)

*Primary Examiner* — Jophy S. Koshy
*Assistant Examiner* — Joshua S Carpenter
(74) *Attorney, Agent, or Firm* — Volpe Koenig

(57) ABSTRACT

An object of the invention is to provide an alloy article that exhibits even better mechanical properties than conventional high entropy alloy articles without sacrificing high corrosion resistance thereof. An alloy article according to the invention comprises matrix phase crystal grains being equiaxed crystals with an average crystal grain size of 150 μm or less, the alloy article having a metallic composition including: Co, Cr, Fe, Ni and Ti, each within a range of 5 atomic % or more and 35 atomic % or less; Mo within a range of more than 0 atomic % and less than 8 atomic %; and a balance comprising inevitable impurities, wherein in the matrix phase crystal grains, ultrafine particles with an average particle size of 100 nm or less and oxide particles with an average particle size of 100 nm or less are dispersedly precipitated.

11 Claims, 5 Drawing Sheets

(51) Int. Cl.
    *B33Y 70/00*          (2020.01)
    *B33Y 40/20*          (2020.01)
    *B22F 3/24*            (2006.01)
    *B22F 9/08*            (2006.01)
    *C22C 30/00*          (2006.01)
    *B22F 10/20*          (2021.01)
    *B33Y 80/00*          (2015.01)
    *B22F 5/00*            (2006.01)

(52) U.S. Cl.
    CPC .............. *B22F 10/20* (2021.01); *B33Y 10/00* (2014.12); *B33Y 40/20* (2020.01); *B33Y 70/00* (2014.12); *B33Y 80/00* (2014.12); *C22C 30/00* (2013.01); *B22F 2003/248* (2013.01); *B22F 2301/15* (2013.01)

(56) References Cited

FOREIGN PATENT DOCUMENTS

| | | |
|---|---|---|
| WO | 2015/020007 A1 | 3/2017 |
| WO | 2017/098848 A1 | 6/2017 |
| WO | 2017/138191 A1 | 8/2017 |

OTHER PUBLICATIONS

Hadraba, Hynek, et al. "Oxide dispersion strengthened CoCrFeNiMn high-entropy alloy." Materials Science and Engineering: A 689 (2017): 252-256. (Year: 2017).*
International Search Report for PCT/JP2018/040474, dated Jan. 15, 2019.

* cited by examiner

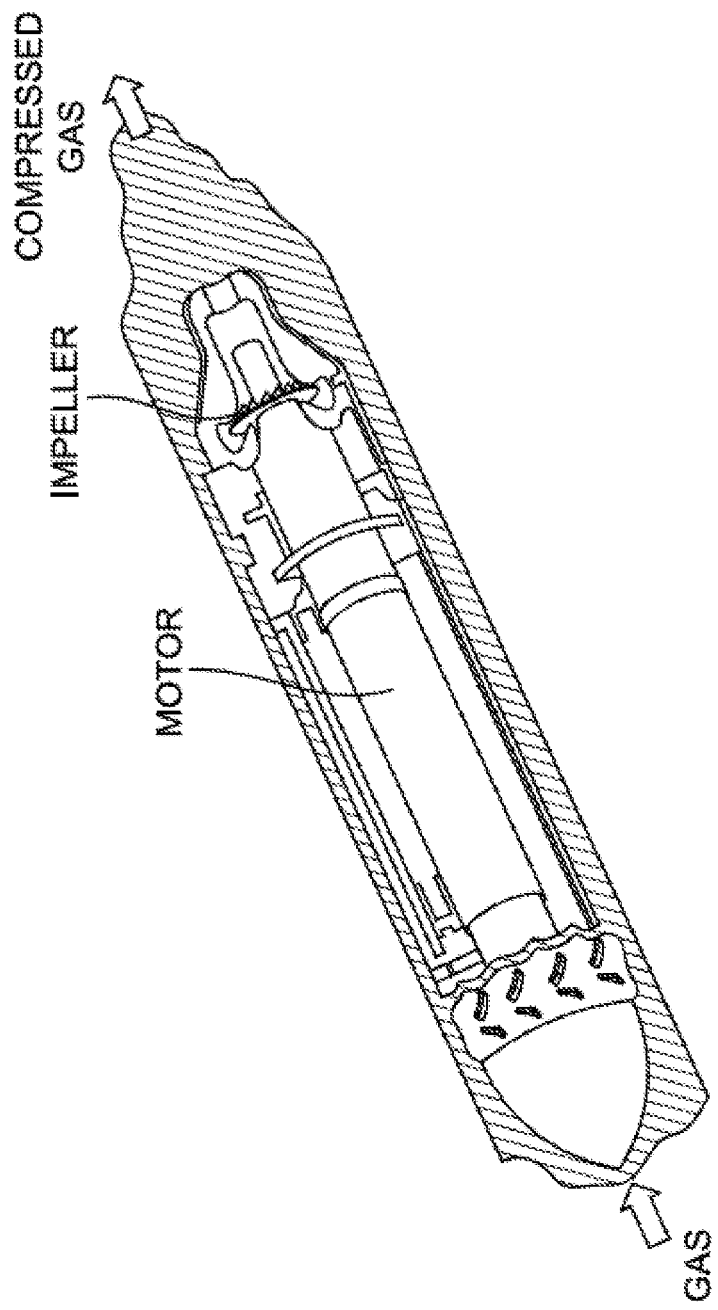

ALLOY ARTICLE, METHOD FOR MANUFACTURING SAID ALLOY ARTICLE, PRODUCT FORMED OF SAID ALLOY ARTICLE, AND FLUID MACHINE HAVING SAID PRODUCT

TECHNICAL FIELD OF THE INVENTION

The present invention relates to the technology of alloys with excellent corrosion resistance and mechanical properties and, in particular, to an alloy article referred to as high entropy alloy, a method for manufacturing the alloy article, a product formed of the alloy article, and a fluid machine having the product.

DESCRIPTION OF BACKGROUND ART

A high entropy alloy (HEA) has recently been developed as an alloy based on a new technological concept which is completely different from the concept of conventional alloys (e.g., an alloy in which a tiny amount of multiple kinds of subcomponent elements is added to one to three kinds of main component elements). The HEA is defined as an alloy configuring more than five kinds of main metallic elements, each having a content of 5 to 35 atomic %, and it is known that the HEA expresses characteristics as described below.

There can be enumerated, e.g., (a) stabilization of the mixed state resulting from the negatively-increasing mixing entropy term in the formula of Gibbs free energy; (b) diffusion delay due to complicated microstructure; (c) improved mechanical characteristics resulting from high lattice strain due to different sizes of constituent atoms; and (d) improved corrosion resistance as the result of combined effects of coexistence of multiple elements (also referred to as a "cocktail effect").

For example, Patent Literature 1 (JP 2002-173732 A) discloses a high entropy multicomponent alloy produced by casting or synthesizing multiple kinds of metallic elements, wherein the alloy contains five to eleven kinds of main metallic elements and the molar number of each kind of main metallic element is 5% to 30% of the total molar number of the alloy. Furthermore, the main metallic elements are selected from a metallic element group containing aluminum (Al), titanium (Ti), vanadium (V), chromium (Cr), iron (Fe), cobalt (Co), nickel (Ni), copper (Cu), zirconium (Zr), molybdenum (Mo), palladium (Pd), and silver (Ag).

According to Patent Literature 1, there can be provided a high entropy multicomponent alloy with higher hardness, higher heat resistance, and higher corrosion resistance, in a cast state, than conventional carbon steels and alloy carbon steels. Unfortunately, however, this high entropy multicomponent alloy is hard to process due to its high hardness and temper softening resistance, which makes it difficult to fabricate a member with a desired shape from it by plastic working or machining.

As a solution to the above problem with Patent Literature 1, Patent Literature 2 (WO 2017/138191 A1) discloses an alloy member having a chemical composition including Co, Cr, Fe, Ni and Ti, each within a range of 5 atomic % or more and 35 atomic % or less, Mo within a range of more than 0 atomic % and 8 atomic % or less, and a balance of inevitable impurities. In the alloy member, ultrafine particles with an average particle size of 40 nm or less are dispersedly precipitated in matrix phase crystals.

According to Patent Literature 2, there can be provided an alloy member that is formed of a high entropy alloy with high mechanical strength and high corrosion resistance and is excellent in alloy composition, microstructural homogeneity, and shape controllability.

Patent Literature 3 will be described later.

CITATION LIST

Patent Literature

Patent literature 1: JP 2002-173732 A;
Patent literature 2: WO 2017/138191 A1; and
Patent literature 3: WO 2015/020007 A1.

SUMMARY OF THE INVENTION

Problems to be Solved by the Invention

At present, research is being conducted on possible uses of high entropy alloys as materials for oil well equipment for drilling for crude oil and natural gas and materials for chemical plants. Since oil well equipment is used in a severe environment of oil well drilling (e.g., exposed to a highly corrosive gas or liquid in an intermediate temperature range, i.e., at a temperature of up to around 350° C.), its materials are required to have high corrosion resistance.

With the recent trend toward greater depths in oil well drilling, the stress under which oil well equipment is operated has inevitably become higher than ever before, requiring alloy materials for oil well equipment to have better mechanical properties.

The alloy member disclosed in Patent literature 2 is considered to be highly promising as it exhibits excellent shape controllability and ductility without sacrificing characteristics as an HEA (e.g., high corrosion resistance and excellent mechanical properties). However, considering usage under higher stress than before, it is desired that an alloy member has even better mechanical properties (e.g., tensile strength and hardness).

Improving tensile strength contributes to, e.g., increasing the rotational speed of a rotary member in a fluid machine (i.e., increasing the discharge flow or pressure of the fluid machine). Also, improving hardness contributes to improving the erosion resistance of a rotary member in a fluid machine (i.e., improving the durability of the fluid machine).

In view of the above, it is an objective of the present invention to provide an alloy article that exhibits even better mechanical properties than conventional HEA articles without sacrificing high corrosion resistance of HEAs, a method for manufacturing the alloy article, a product formed of the alloy article, and a fluid machine having the product.

Solution to Problems (I) According to one aspect of the present invention, there is provided an alloy article whose matrix phase crystal grains are equiaxed crystals with an average crystal grain size of equal to or less than 150 μm. The alloy article has a metallic composition including: Co, Cr, Fe, Ni and Ti, each within a range of equal to or more than 5 atomic % and equal to or less than 35 atomic %; Mo within a range of more than 0 atomic % and less than 8 atomic %; and a balance comprising inevitable impurities. In the matrix phase crystal grains, ultrafine particles with an average particle size of equal to or less than 100 nm and oxide particles with an average particle size of equal to or less than 100 nm are dispersedly precipitated.

In the above alloy article (I) of the invention, the following modifications and changes can be made.

(i) The metallic composition may further comprise one of Y (yttrium), Nb (niobium), Al and V within a range of more than 0 atomic % and equal to or less than 4 atomic %, and the total amount of the one of Y, Nb, Al and V and the Mo may be equal to or less than 8 atomic %.

(ii) The oxide particles may be particles of an oxide of an element included in the metallic composition, and the standard Gibbs energy of formation of the oxide may be larger in negative number than the standard Gibbs energy of formation of $Fe_3O_4$ at 25° C.

(iii) The chemical composition may comprise: the Co within a range of equal to or more than 20 atomic % and equal to or less than 35 atomic %; the Cr within a range of equal to or more than 10 atomic % and equal to or less than 25 atomic %; the Fe within a range of equal to or more than 10 atomic % and equal to or less than 25 atomic %; the Ni within a range of equal to or more than 15 atomic % and equal to or less than 30 atomic %; and the Ti within a range of equal to or more than 5 atomic % and equal to or less than 15 atomic %.

(iv) The ultrafine particles may be crystalline particles in that the Ni and the Ti are concentrated than in the matrix phase crystal Grains.

(v) The matrix phase crystal grains may have a crystal structure of face-centered cubic crystal or a mixture of face-centered cubic crystal and simple cubic crystal.

(II) According to another aspect of the invention, there is provided a method for manufacturing the above-described alloy article. The method includes: a raw material mixing and melting step of mixing and melting raw materials of the alloy article to form a molten metal; an atomization step of forming an alloy powder from the molten metal; a mixed powder preparation step of preparing a mixed powder by mixing the alloy powder and a powder of an oxygen atom supply source oxide; an additive manufacturing step of forming an alloy formed article having a desired shape from the mixed powder by additive manufacturing; and a pseudo-solution heat treatment step of subjecting the alloy formed article to a pseudo-solution heat treatment within a temperature range of equal to or more than 1000° C. and equal to or less than 1250° C.

In the above manufacturing method (II) of the invention, the following modifications and changes can be made.

(vi) The oxygen atom supply source oxide may be at least one of $Fe_2O_3$, $Fe_3O_4$, and NiO.

(vii) The pseudo-solution heat treatment step may include a cooling process of air-cooling, gas-cooling or water-cooling after a holding process within the temperature range.

(III) According to still another aspect of the invention, there is provided a product formed of an alloy article. The alloy article is the above-described alloy article, and the product is an impeller.

(IV) According to still another aspect of the invention, there is provided a fluid machine which incorporates the above-described impeller.

In the above fluid machine (IV) of the invention, the following modifications and changes can be made.

(viii) The fluid machine may be a compressor or a pump.

Advantages of the Invention

According to the present invention, it is possible to provide an alloy article that exhibits even better mechanical properties than conventional HEA articles without sacrificing high corrosion resistance of HEAs. Furthermore, it is possible to provide a product formed of the alloy article, and a fluid machine having the product.

BRIEF DESCRIPTION OF THE DRAWINGS

FIG. 3 shows an example of a fluid machine having a product according to the invention, and is a schematic drawing illustrating a cross-sectional view of a centrifugal compressor into which the impeller according to the invention is incorporated;

Figure 1:
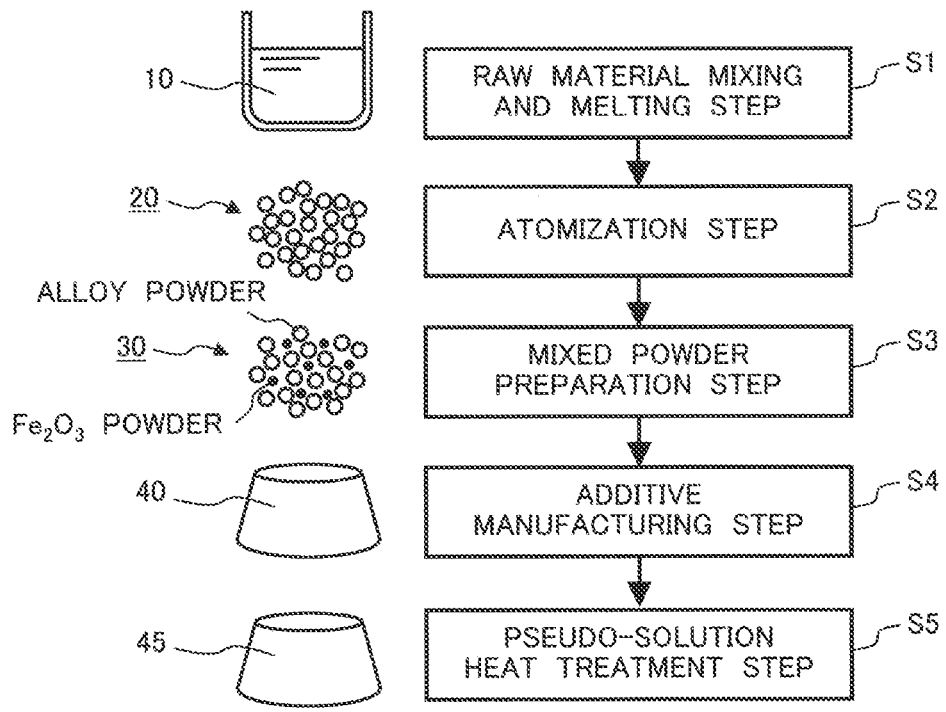
FIG. 1 is an exemplary process chart showing a method for manufacturing an alloy article according to the present invention.

DETAILED DESCRIPTION OF THE PREFERRED EMBODIMENTS (Initial Study and Basic Concept of Present Invention)

The present inventors, with an aim to develop an alloy article that exhibits even better mechanical properties than conventional alloy articles without sacrificing the high corrosion resistance of HEAs and to develop a product including the alloy article, focused their attention on oxide particle dispersion strengthening.

Oxide particle dispersion strengthening is a well-known technique in the field of Ni-based superalloys (e.g., see Patent literature 3 (WO 2015/020007 A1). Patent literature 3 discloses that regarding a method for manufacturing the Ni-based alloy article, it is generally considered to employ a powder metallurgy technique in order to uniformly disperse oxide particles. However, powder metallurgy techniques (e.g., hot isostatic pressing) have a weak point that they are not always suitable for manufacturing members with complicated shapes such as impellers in terms of manufacturing cost.

On the other hand, in recent years, there has been a growing attention to three-dimensional shape-forming technology (so-called 3D printing) such as additive manufacturing (AM) as a technique to manufacture metal members to a near net shape. Since additive manufacturing is capable of directly forming even members with complicated shapes, it is extremely attractive in terms of reducing manufacturing work time and improving manufacturing yield (i.e., reducing manufacturing cost).

The inventors, as an initial study, attempted to fabricate an alloy article from a mixed powder containing an HEA powder and Ti oxide particles by additive manufacturing. However, in the process of additive manufacturing (in which an article is built by repeating local melting and rapid solidification), the Ti oxide particles easily agglomerated near the solidification surface, which made it difficult to achieve uniform dispersion of the Ti oxide particles in the matrix phase crystal grains.

Through detailed examination and consideration of the results of the initial study, the inventors attributed the undesirable results to the excessively high thermodynamic stability of the Ti oxide particles intended to be dispersed. In other words, they thought that the high thermodynamic stability of the Ti oxide particles may have prevented them from fully melting in the local melting process in additive manufacturing, and the difference in specific gravity between the matrix phase alloy melt and the Ti oxide particles may have caused the agglomeration of the Ti oxide particles near the solidification surface.

Then, the inventors formulated a hypothesis that uniform dispersion of oxide particles in the matrix phase crystal grains may be achieved by mixing in oxide particles that easily melt or thermally decompose in the local melting process in additive manufacturing as a starting material and actively dissociating the oxygen atoms by the melting or thermal decomposition in the local melting process so as to allow the dissociated oxygen atoms to recombine with other appropriate metallic atoms in the rapid solidification process.

The inventors have focused on the standard Gibbs energy of metal oxide formation as an indicator of thermodynamic stability, and have carried out intensive research on the relationship among alloy compositions, microstructures, and mechanical properties. As a result, the inventors have found that by using oxide particles (a source of oxygen atoms) that are easily melted or thermally decomposed during the local melting of the additive manufacturing, oxide particles with an average particle size of 100 nm or less are dispersedly precipitated in the matrix crystal grains of an additively manufactured alloy article.

Specifically, it has been found that performing additive manufacturing using a mixed powder prepared by adding an Fe oxide powder ($Fe_2O_3$ powder, $Fe_3O_4$ powder) and/or an Ni oxide powder (NiO powder) to a Co—Cr—Fe—Ni—Ti—Mo system alloy powder allows oxide particles of Ti component to precipitate dispersedly in the matrix phase crystal grains of an alloy article. It has also been found that performing additive manufacturing using a mixed powder prepared by adding an $Fe_2O_3$ powder, an $Fe_3O_4$ powder, and/or an NiO powder to an alloy powder prepared by adding any one of Y, Nb, Al and V to a Co—Cr—Fe—Ni—Ti—Mo system alloy powder allows oxide particles of Ti component and oxide particles of the added component to precipitate dispersedly in the matrix phase crystal grains of an alloy article.

Here, the standard Gibbs energy of formation will be briefly described. The standard Gibbs energy of formation is defined as the change in Gibbs energy that occurs when a substance is formed from its component element as a simple substance in the standard state (298.15 K=25° C.). The ease or difficulty of chemical reactions (in other words, thermodynamic stability) of a substance can be estimated by comparing its standard Gibbs energy of formation to those of other substances. The standard Gibbs energies of formation of the representative oxides of metallic elements to be used in the present invention are shown in Table 1.

TABLE 1

Standard Gibbs energies of formation of representative oxides of metallic elements to be used in the invention (at 25° C.).

| Metallic element | Oxide | Standard Gibbs energy of formation (kJ/mol) | |
|---|---|---|---|
| Fe | $Fe_2O_3$ | −742 | Oxide that can be source of oxygen atoms |
|  | $Fe_3O_4$ | −1015 |  |
| Ni | NiO | −212 |  |
| Ti | $Ti_2O_3$ | −1434 | Oxide that can form and precipitate |
|  | $Ti_3O_5$ | −2318 |  |
| Y | $Y_2O_3$ | −1817 |  |
| Nb | $Nb_2O_3$ | −1766 |  |
| Al | $Al_2O_3$ | −1564 |  |
| V | $V_2O_3$ | −1139 |  |
|  | $V_2O_4$ | −1313 |  |
|  | $V_2O_5$ | −1420 |  |

As seen from Table 1, the standard Gibbs energy of formation of each of the Ti, Y, Nb, Al and V oxides are larger in negative number (negative value) than those of Fe oxides ($Fe_2O_3$, $Fe_3O_4$) and an Ni oxide (NiO). Therefore, it is considered to be thermodynamically more stable to reduce an Fe oxide or an Ni oxide in the local melting and rapid solidification process in additive manufacturing and to form and precipitate an oxide of any one of Ti, Y, Nb, Al, and V. Accordingly, in the present invention, oxides that are relatively small in negative number of their standard Gibbs energy of formation, such as $Fe_2O$, $Fe_3O_4$, and NiO, are referred to as "oxygen atom supply source oxides".

The inventors have confirmed that an alloy article containing oxide particles of any one of Ti, Y, Nb, Al and V dispersedly precipitated in the matrix phase crystal grains have better mechanical properties than conventional alloy articles (e.g., a Vickers hardness of 460 Hv or more and/or a tensile strength of 1450 MPa or more). The present invention has been made based on these findings.

Hereinafter, preferred embodiments of the invention will be described with reference to the drawings according to the alloy article production procedures. However, the invention is not limited to specific embodiments described below, and various combinations and modifications are possible without departing from a technical concept of the invention.

[Method for Manufacturing Alloy Article]

FIG. 1 is an exemplary process chart showing a method for manufacturing an alloy article according to the invention. As shown in FIG. 1, the method for manufacturing an alloy article according to the invention includes: a raw material mixing and melting step (S1); an atomization step (S2); a mixed powder preparation step (S3); an additive manufacturing step (S4); and a pseudo-solution heat treatment step (S5). Each step will be hereinafter described more specifically.

(Raw Material Mixing and Melting Step)

In the raw material mixing and melting step S1, a molten metal 10 is formed by mixing and melting raw materials in such a way that the molten metal 10 has a desired metallic composition, taking account of the amount of the metal component contained in the oxygen atom supply source oxide (e.g., the amount of Fe) to be added in the subsequent mixed powder preparation step S3. There are no particular limitations on the mixing or melting method of the raw materials, and any conventional method may be used.

The metallic composition according to the invention includes five elements, Co, Cr, Fe, Ni and Ti, as main components, each within a range of 5 atomic % or more and 35 atomic % or less. It also includes, as an accessory component, Mo within a range of more than 0 atomic % and less than 8 atomic %, and remainder substances are inevitable impurities. Also, the metallic composition may further include one of Y, Nb, Al and V within a range of More than 0 atomic % and 4 atomic % or less as an optional accessory component. It should be noted that an optional accessory component means a component that may or may not be included.

More specifically, content of the component Co is preferably 20 atomic % or more and 35 atomic % or less; more preferably 25 atomic % or more and 33 atomic % or less; and further preferably 25 atomic % or more and 30 atomic % or less.

Content of the component Cr is preferably 10 atomic % or more and 25 atomic % or less; more preferably 15 atomic % or more and 23 atomic % or less; and further preferably 15 atomic % or more and 20 atomic % or less.

Content of the component Fe is preferably 10 atomic % or more and 25 atomic % or less; more preferably 15 atomic % or more and 23 atomic % or less; and further preferably 15 atomic % or more and 20 atomic % or less.

Content of the component Ni is preferably 15 atomic % or more and 30 atomic % or less; more preferably 17 atomic % or more and 28 atomic % or less; and further preferably 23 atomic % or more and 28 atomic % or less.

Content of the component Ti is preferably 5 atomic % or more and 15 atomic % or less; more preferably 5 atomic % or more and 10 atomic % or less; and further preferably 7 atomic % or more and 10 atomic % or less.

Content of the component Mo is preferably more than 0 atomic % and less than 8 atomic %; more preferably 1 atomic % or more and 7 atomic % or less; and further preferably 1 atomic % or more and 5 atomic % or less.

Also, in the case of adding an optional accessory component (Y, Nb, Al, or V), the optional accessory component should preferably be more than 0 atomic % and 4 atomic % or less, and more preferably 1 atomic % or more and 3 atomic % or less. Moreover, the total content of the optional accessory component and the Mo should preferably be more than 0 atomic % and 8 atomic % or less, more preferably 1 atomic % or more and 7 atomic % or less, and even more preferably 2 atomic % or more and 6 atomic % or less.

By controlling the content of each component as above, the mechanical properties of the alloy article can be improved without sacrificing the corrosion resistance. In other words, if each component fails to fall within its preferable content range, it makes it difficult to achieve desired properties.

Herein, the inevitable impurities refer to components that are difficult to be removed completely but should be reduced as much as possible. Examples include Si (silicon), P (phosphorous), S (sulfur), and N (nitrogen).

Specifically, the Si content should preferably be 0.2 mass % or less, more preferably 0.1 mass % or less, and even more preferably 0.05 mass % or less. The P content should preferably be 0.1 mass % or less, more preferably 0.05 mass % or less, and even more preferably 0.02 mass % or less. The S content should preferably be 0.1 mass % or less, more preferably 0.05 mass % or less, and even more preferably 0.02 mass % or less. The N content should preferably be 0.1 mass % or less, more preferably 0.05 mass % or less, and even more preferably 0.02 mass % or less.

The O (oxygen) component is not included in the inevitable impurities in the invention as it is an essential component to form an oxide. However, an excessive content of oxygen would result in oxide coarsening and cause the finished alloy article to embrittle easily. For this reason, the content of the O component should preferably be controlled to be 0.1 mass % or more and 3 mass % or less, more preferably 0.15 mass % or more and 2.5 mass % or less, and even more preferably 0.2 mass % or more and 2 mass % or less.

(Atomization Step)

In the atomization step S2, an alloy powder 20 is formed from the molten metal 10. There are no particular limitations on the atomization method, and any conventional method may be used. For example, gas atomizing or centrifugal force atomizing may be preferably used.

There are no particular limitations on the average particle size of the alloy powder 20, but from the viewpoint of the fluidity and fillability in forming a shape out of the alloy powder 20, it should preferably be 5 μm or more and 200 μm or less, more preferably 10 μm or more and 100 μm or less, and even more preferably 10 μm or more and 50 μm or less.

If the average particle size of the alloy powder 20 is less than 5 μm, it reduces the fluidity of the alloy powder 20 in the subsequent additive manufacturing step S4 (e.g., the formability of an alloy powder bed in additive manufacturing deteriorates), which becomes a factor of causing a poor shape accuracy of the formed article. In contrast, if the average particle size of the alloy powder 20 exceeds 200 μm, it makes it difficult to achieve homogeneous mixing with the powder of the oxygen atom supply source oxide (i.e., it is prone to result in inhomogeneous mixing) in the subsequent mixed powder preparation step S3, which becomes a factor of causing an uneven dispersion of the oxide particles in the subsequent additive manufacturing step S4

(Mixed Powder Preparation Step)

In the mixed powder preparation step S3, a mixed powder 30 is prepared by mixing the alloy powder 20 and the powder of the oxygen atom supply source oxide ($Fe_2O_3$ powder in FIG. 1, for illustrative purposes). There are no particular limitations on the powder mixing method, and any conventional method may be used. The amount of the oxygen atom supply source oxide to be mixed in may be determined basically by back calculation from the amount of the oxide particles intended to be dispersedly precipitated. For example, when the total amount of the alloy powder 20 is 100 parts by mass, the oxygen atom supply oxide should preferably be mixed in in an amount of 1 part by mass or more and 10 parts by mass or less. As will be understood, the composition of the alloy powder 20 is adjusted taking account of the amount of the metal component from the oxygen atom supply source oxide to be added.

Generally, in order to mix two kinds of powders homogeneously, it is preferable that the two powders be similar in their average size (e.g., the ratio of the average particle sizes is within 2) Therefore, a powder particle size adjustment substep (S3a) may be performed to adjust the respective average particle sizes of the alloy powder 20 and the oxygen atom supply source oxide powder before a powder mixing substep (S3b) where the alloy powder 20 and the oxygen atom supply source oxide powder are mixed in. As the method of adjusting the average particle sizes of powders, classification or granulation may be appropriately used, for example.

Meanwhile, the procedure of the invention may not necessarily be limited to the procedure described above, in which the atomization step S2 is followed by the mixed powder preparation step S3. For example, as long as an alloy AM article 40 or alloy formed article 45 with a desired microstructure can be obtained as a result of the subsequent additive manufacturing step S4 or pseudo-solution heat treatment step S5, the oxygen atom supply source oxide may be added in the atomization step S2. In such a case, the mixed powder preparation step S3 may be omitted (in other words, the atomization step S2 and the mixed powder preparation step S3 may be combined).

(Additive Manufacturing Step)

In the additive manufacturing step S4, the mixed powder 30 prepared as above is subjected to additive manufacturing (AM) to form an alloy AM article 40 having a desired shape. The application of additive manufacturing, in which a near net shape metal member is obtained by local melting and rapid solidification instead of sintering, makes it possible to directly fabricate a three-dimensional member with a complicated shape as well as mechanical properties comparable to or better than those of forged articles. There are no particular limitations on the additive manufacturing method, and any conventional method may be used. For example, selective laser melting (SLM) should preferably be used because its solidification speed, which is important in terms of structural control, is relatively high, making it possible to achieve a relatively small surface roughness of the alloy AM article 40.

The additive manufacturing step S4 by SLM will be hereinafter described briefly. This step S4 includes two alternately repeated substeps: a mixed powder bed preparation substep S4$a$ and a laser melting and solidification substep S4$b$. In the mixed powder bed preparation substep S4$a$, the mixed powder 30 is spread into a mixed powder bed with a predetermined thickness. In the laser melting and solidification substep S4$b$, a predetermined area of the mixed powder bed is irradiated with a laser beam so as to locally melt and rapidly solidify the area of the mixed powder 30.

More specifically, when the thickness h of the mixed powder bed is set at 0.002 to 0.2 mm, the output power P of the laser beam is set at 50 to 1000 W, the scanning speed S of the laser beam is set at 50 to 10000 mm/s, and the scanning interval L of the laser beam is set at 0.05 to 0.2 mm, for example, the volume energy density E of the local melting, represented by the formula $E=P/(h \times S \times L)$, should preferably be controlled to 20 to 200 J/mm$^3$ so that the density and the shape accuracy of the obtained alloy AM article 40 will become as high as possible. The volume energy density E should more preferably be controlled to be 40 to 150 J/mm$^3$.

The alloy AM article 40 formed through the above substeps is usually buried in the mixed powder bed. Therefore, a taking out substep S4$c$ to take out the alloy AM article 40 from the alloy powder bed is then performed. A method to take out the alloy AM article 30 is not particularly limited, and any conventional method can be utilized. For example, a sandblasting technique using the mixed powder 30 is preferable. The sandblasting technique using the mixed powder 30 enables the removed mixed powder bed to be ground together with the blasted mixed powder 30, and the obtained mixed powder can be reused as a mixed powder 30.

A sample for microstructure observation was taken from the alloy AM article 40 after the taking out substep S4$c$ and subjected to electron backscatter diffraction (EBSD) using a scanning electron microscope (SEM) to observe the crystal grain form of the sample. In an inverse pole figure map, the matrix phase of the alloy AM article 40 was observed to bristle with fine columnar crystals (with an average width of 50 µm or less) along the direction of building (the so-called local melting and rapid solidification structure). Further observation revealed that an intermetallic compound phase (e.g., Ni$_3$Ti phase) was precipitated in the matrix phase crystals of the alloy AM article 40.

(Pseudo-Solution Heat Treatment Step)

In the pseudo-solution heat treatment step S5, the alloy AM article 40 is subjected to a pseudo-solution heat treatment to almost completely solutionize the precipitated intermetallic compound phase. An alloy formed article 45 obtained through this step S5 is an embodiment of the alloy article according to the invention. It should be noted that regarding the alloy article according to the present invention, there are no academically established findings such as phase equilibrium diagrams, and the solvus temperature of the precipitated phase is unclear. This makes it impossible to accurately define the temperature at which it is completely solutionized. For this reason, the heat treatment in this step S5 is called "pseudo-solution heat treatment".

The temperature of this heat treatment should preferably be 1000 to 1250° C., more preferably 1050 to 1200° C., and even more preferably 1100 to 1180° C. If this heat treatment temperature is less than 1000° C., it does not allow the intermetallic compound phase to be fully solutionized. In contrast, if this heat treatment temperature exceeds 1250° C., it leads to excessive coarsening of the matrix phase crystal grains, reducing the corrosion resistance and deteriorating the mechanical properties. There are no particular limitations on the heating atmosphere, and it may be the air or a non-oxidizing atmosphere (an atmosphere in which virtually no oxygen is present, such as a vacuum and a high purity argon).

Furthermore, after the alloy AM article 40 has been held within the temperature range for 0.1 to 100 hours, it should preferably be that the alloy AM article 40 is quickly cooled (e.g., by air-cooling, gas-blast-cooling or water-cooling). Specifically, by rapid cooling (e.g., cooling at a rate of at least 10° C./s) the alloy AM article 40 to allow it to quickly pass specific temperature range (e.g., from 900 to 800° C.) in which the intermetallic compound phase tends to be re-precipitated and its particles easily grow, it is possible to obtain an alloy formed article 45 having a microstructure in which nanoscale ultrafine particles are dispersedly precipitated in the matrix phase crystal grains.

The matrix phase crystal grains in the alloy formed article 45 are equiaxed crystals with an average grain size of 150 µm or less, in which the crystal structure thereof should preferably be face-centered cubic (FCC). If the average grain size exceeds 150 µm, it reduces the corrosion resistance and deteriorates the mechanical properties. The average grain size should more preferably be 100 µm or less.

It is considered that the alloy formed article 45 exhibits both high corrosion resistance and excellent mechanical properties because it mainly contains face-centered cubic crystals, which have a kind of close-packed structure. It should be noted that the present invention does not deny the possibility that some of the matrix phase crystal grains have a simple cubic (SC) structure.

The average size of dispersedly precipitated ultrafine particles is 100 nm or less. It should preferably be 10 nm or more and 100 nm or less, and more preferably 20 nm or more and 80 nm or less. If the average size of the ultrafine particles is less than 10 nm or more than 100 nm, it does not contribute to improving the mechanical properties. Since the average size of the ultrafine particles tends to become smaller as the cooling rate in the pseudo-solution heat treatment becomes larger, the average size of the ultrafine particles should preferably be controlled by controlling the cooling rate.

Similarly, the average particle size of the oxide particles dispersedly precipitated is 100 nm or less. It should preferably be 5 nm or more and 100 nm or less, and more preferably 20 nm or more and 80 nm or less. If the average size of the oxide particles is less than 5 nm or more than 100 nm, it does not bring about a sufficient effect of improving mechanical properties. In order to control the average size and the dispersed precipitation of the oxide particles, a homogeneous mixing should preferably be achieved in the mixed powder preparation step S3.

[Products Formed of Alloy Article]

Figure 2:
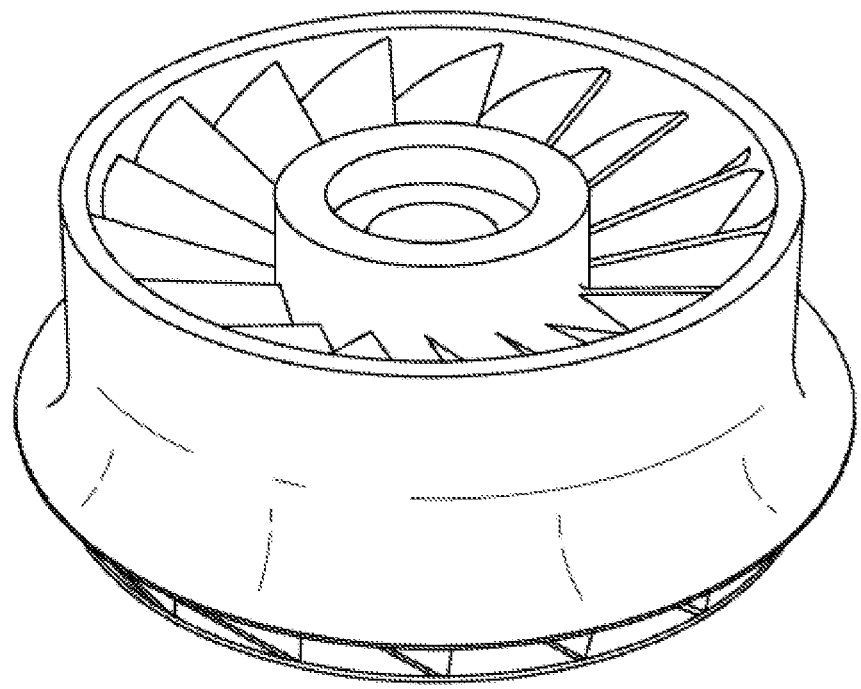
FIG. 2 shows an example of a product formed of an alloy article according to the invention, and is a photograph of an impeller of a fluid machine.

FIG. 2 shows an example of a product formed of an alloy article according to the invention, and is a photograph of an impeller of a fluid machine. Since a product according to the invention is manufactured by an additive manufacturing method, it is possible to easily form an object with a complicated shape as shown in FIG. 2. Furthermore, the impeller formed of the alloy article according to the invention has both excellent mechanical characteristics and high corrosion resistance; therefore, it is significantly durable even in severe operating environments. A product of the invention can include piping parts and drilling parts etc. in addition to impellers.

[Fluid Machine Having Product]

FIG. 3 shows an example of a fluid machine having a product according to the invention, and is a schematic drawing illustrating a cross-sectional view of a centrifugal compressor into which the impeller (see FIG. 2) according to the invention is incorporated. The use of the impeller of the invention, which is significantly durable even in severe operating environments, will contribute to the improved long-term reliability of the centrifugal compressor.

Examples

Hereinafter, the invention will be described more specifically by showing experimental examples. However, the invention is not limited to those experimental examples.

[Experiment 1]

(Preparation of Alloy Powders P1 to P5)

The raw material mixing and melting step was conducted, in which raw materials were mixed so as to have nominal composition shown in Table 2 and melted with a high frequency melting furnace to form a molten metal. Then, the atomizing step was conducted using the gas atomizing technique to form an alloy powder from the molten metal. Subsequently, the obtained alloy powder was sieved into a particle diameter range from 20 to 45 μm. Thus, alloy powders P1 to P5 were prepared. Then, the particle size distributions of the alloy powders P1 to P5 were measured by means of a laser diffraction particle size distribution measuring apparatus. The result indicates that the average particle diameter of each powder was approximately 30 μm.

TABLE 2

Nominal composition of alloy powders P1 to P5 (unit: atomic %).

| Alloy powder | Co | Cr | Fe | Ni | Ti | Mo | Y |
|---|---|---|---|---|---|---|---|
| P1 | 27.9 | 16.5 | 17.4 | 27.7 | 7.5 | 3.0 | — |
| P2 | 27.5 | 16.3 | 16.4 | 27.9 | 8.9 | 3.0 | — |
| P3 | 27.3 | 15.5 | 15.7 | 28.4 | 10.2 | 2.9 | — |
| P4 | 27.3 | 16.3 | 16.4 | 27.3 | 7.9 | 3.4 | 1.4 |
| P5 | 27.1 | 16.8 | 16.3 | 26.9 | 7.3 | 2.9 | 2.7 |

"—" in Table 2 indicates the element was not intentionally included.

As shown in Table 2, the alloy powders P1 to P3 are HEA powders with conventional metallic compositions, and the alloy powders P4 and P5 are HEA powders prepared by adding Y component to conventional HEAs.

(Preparation of Mixed Powders MP2 to MP5)

The alloy powders P2 to P5 prepared above were each mixed with an $Fe_2O_3$ powder formed by granulation to have an average particle size of approximately 15 μm. The mixing ratio between each alloy powder and the $Fe_2O_3$ powder was set as shown in Table 3, with the total amount of the alloy powder 20 being 100 parts by mass. The alloy powder P1 was not mixed with the $Fe_2O_3$ powder and served as a reference sample for the present invention.

TABLE 3

Mixing ratio of $Fe_2O_3$ powder in mixed powders MP2 to MP5.

| Mixed powder | Alloy powder | $Fe_2O_3$ powder |
|---|---|---|
| MP2 | P2 = 100 parts by mass | 2.4 parts by mass |
| MP3 | P3 = 100 parts by mass | 8.0 parts by mass |
| MP4 | P4 = 100 parts by mass | 1.3 parts by mass |
| MP5 | P5 = 100 parts by mass | 2.4 parts by mass |

[Experiment 2]

(Fabrication of Alloy Formed Articles FA1 to FA5)

Each of the alloy powders P1 and the mixed powders MP2 to MP5 prepared in Experiment 1 was subjected to SLM according to the additive manufacturing step S4 described above using an additive manufacturing device (a product of EOS GmbH, model: EOSINT M290) to form an alloy AM article (a prismatic article, 25 mm in length×25 mm in width×70 mm in height, the height direction was the direction of building). The thickness h of the alloy powder bed was set at 0.04 mm, and the output power P, the scanning speed S, and the scanning interval L of the laser beam were controlled such that the volume energy density E would fall within the range of 40 to 100 J/mm³.

After the taking out substep, the pseudo-solution heat treatment step was performed for the alloy AM articles, wherein the alloy AM articles were held at 1180° C. for 3 hours in the atmospheric air and then rapidly cooled, so as to produce alloy formed articles FA1 to FA5. In the rapid cooling process, the alloy AM articles heated were cooled using an air-cooling method (at an average cooling rate of approximately 10° C./s at a temperature from 900 to 800° C.)

[Experiment 3]

(Microstructure Observation of Alloy Formed Articles)

A test specimen for microstructure observation was sampled from each of the alloy formed articles FA1 to FA5 fabricated in Experiment 2 and subjected to microstructure observation and evaluation using a scanning electron microscope (SEM), a scanning transmission electron microscope/energy-dispersive X-ray analyzer (STEM-EDX), and an X-ray diffractometer (XRD).

Figure 4A:
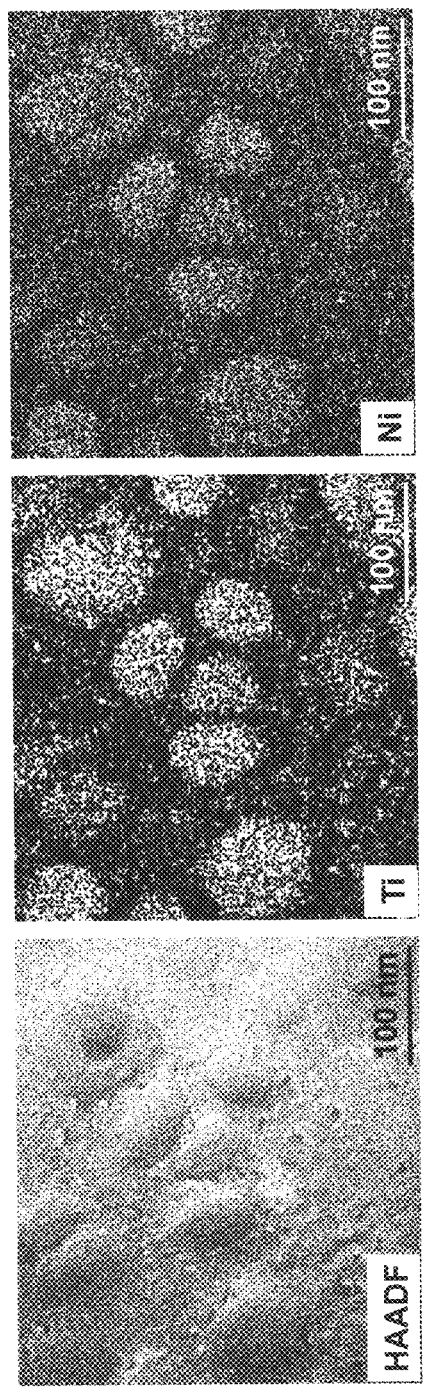
FIG. 4A is a high-angle annular dark-field image (HAADF image) with elemental maps (Ti component map and Ni component map), showing an example of a microstructure of alloy formed article FA2, formed from mixed powder MP2.

FIG. 4A is a high-angle annular dark-field image (HAADF image) with elemental maps (Ti component map and Ni component map), showing an example of a microstructure of the alloy formed article FA2, formed from the mixed powder MP2. FIG. 4A indicates precipitation of ultrafine particles with an average size of 100 nm or less in which Ti and Ni are concentrated. From a separately measured electron diffraction pattern, it was revealed that the ultrafine particles were crystalline particles. Also, it was separately confirmed that similar results were obtained with other alloy formed articles as well.

Figure 4B:
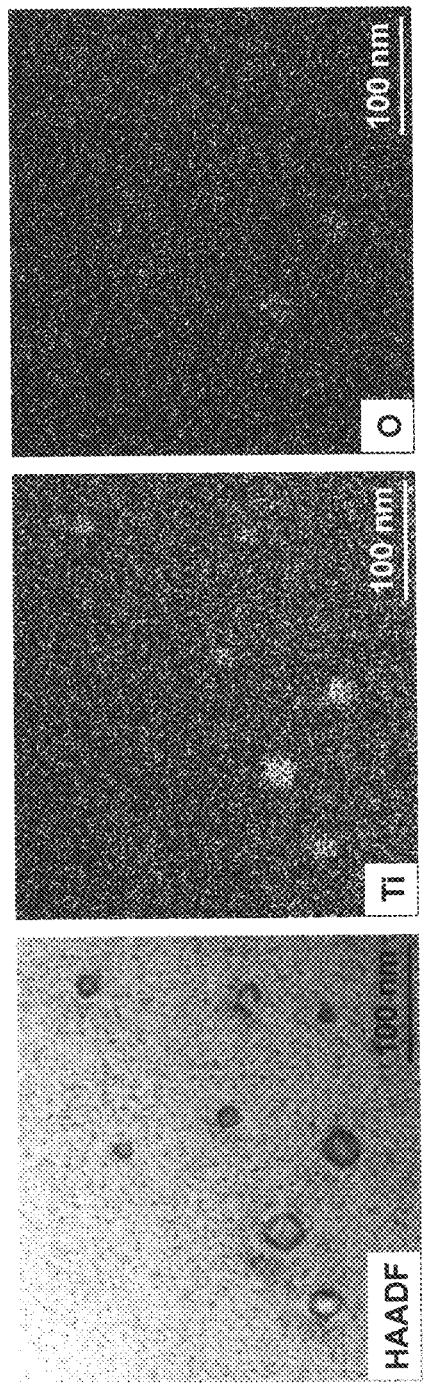
FIG. 4B is an HAADF image with elemental maps (Ti component map and O component map), showing another example of a microstructure of the alloy formed article 2, formed from the mixed powder MP2.

FIG. 4B is an HAADF image with elemental maps (Ti component map and O component map), showing another example of a microstructure of the alloy formed article FA2, formed of the mixed powder MP2. FIG. 4B indicates precipitation of particles with an average size of 100 nm or less in which Ti and O are concentrated also in this region. From a separately measured electron diffraction pattern, it was revealed that the particles precipitated in the alloy formed article FA2 had a crystal structure with large unit cells, which is different from that of the matrix phase and typical of oxides (i.e., they were oxide particles). Also, it was separately confirmed that oxide particles were finely and dispersedly precipitated also in the other alloy formed articles FA3 to FA5, as in FA2.

Moreover, regarding the alloy formed article FA4, formed from the mixed powder MP4, and the alloy formed article FA5, formed from the mixed powder MP5, it was found that they contained not only oxide particles including Ti component but also oxide particles including Y component.

Figure 5:
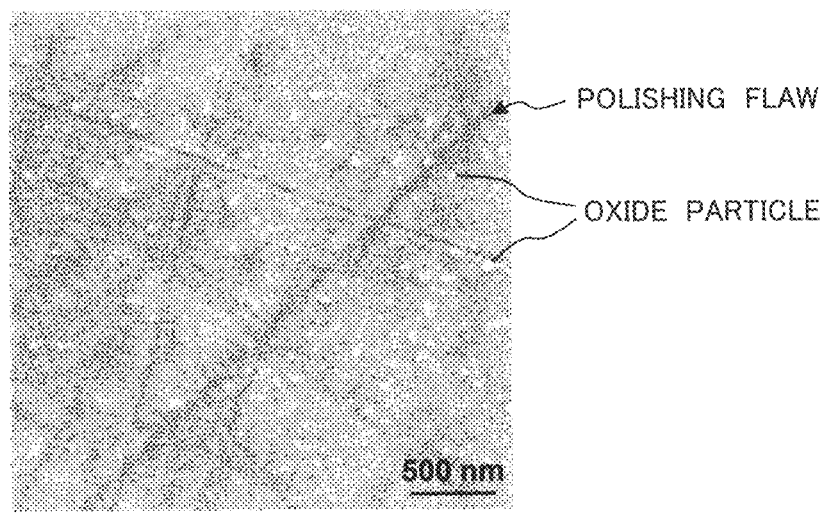
FIG. 5 is an scanning electron microscopy image (SEM image) showing an example of a microstructure of alloy formed article FA3, formed from mixed powder MP3.

FIG. 5 is an SEM image showing an example of a microstructure of the alloy formed article FA3, formed from the mixed powder MP3. FIG. 5 indicates dispersed precipitation of oxide particles with an average size of 100 nm or less (the white spots in the figure). Also, it was separately confirmed that similar results were obtained with the other alloy formed articles FA2, FA4 and FA5 as well.

Meanwhile, it is difficult to observe the ultrafine particles like those shown in FIG. 4A in an SEM image like FIG. 5 because they have a smaller difference in composition from the matrix phase than the oxide particles (i.e., the contrast in compositional difference is small). In other words, for the observation of ultrafine particles, STEM-EDX should preferably be used as in FIG. 4A.

Each of the obtained electron microscope observation images was subjected to image analysis using image analysis software (ImageJ, the public-domain image processing software developed by the National Institute of Health (NIH) in U.S.A.) to measure the total area ratio of the precipitated particles (ultrafine particles and oxide particles). As a result, it was revealed that the alloy formed articles FA2 to FA5 each had a larger total area ratio of the precipitated particles than the alloy formed article FA1 because an oxide particle is precipitated in the alloy formed articles FA2 to FA5. The measurement results are shown in Table 4.

Electron backscatter diffraction (EBSD) analysis on each alloy formed article revealed that the alloy formed articles FA2 to FA5 according to the invention each had a matrix phase structure including equiaxed crystals with an average crystal grain size of 150 µm or less. It was also found that the matrix phase structure of an alloy product fabricated by additive manufacturing was a metallic structure that had undergone recrystallization due to the pseudo-solution heat treatment after the melting and solidification of the raw material alloy (i.e., it was not the structure of a solidified alloy or the structure of a sintered alloy powder).

Furthermore, XRD measurements on each of the alloy formed articles FA1 to FA5 revealed that the matrix phase crystal grains were mainly face-centered cubic (FCC) crystals. Meanwhile, since it is difficult to completely differentiate FCC crystals from simple cubic (SC) crystals based on the XRD measurement results, it cannot be concluded that none of the matrix phase crystal grains are SC crystals. Because the precipitated particles are very small in size as shown in FIGS. 4A to 5, no diffraction peak of the precipitated particles was detected. In other words, a precipitation phase of the precipitated particles could not be identified.

[Experiment 4]
(Measurement of Mechanical Properties and Corrosion Resistance)

A test specimen (10 mm in length×10 mm in width×3 mm in thickness) was sampled from each of the alloy formed articles fabricated in Experiment 2 to measure the mechanical properties and corrosion resistance of each alloy formed article. Here, as a representative mechanical property, Vickers hardness was measured at ten points using a Vickers hardness tester (a product of Shimadzu Corporation, micro Vickers hardness tester, model: HMV), and the average of the eight values calculated after excluding the maximum and minimum values was used as the Vickers hardness of the alloy formed article. Also, based on the obtained average value of Vickers hardness, the tensile strength of each alloy formed article was calculated using the following approximate conversion formula: tensile strength (unit: MPa) =3.12×Vickers hardness (unit: Hv)+16. The results are shown in Table 4.

The corrosion resistance of each alloy formed article was measured as follows. Each test specimen was immersed in 5% boiling sulfuric acid at 3.75 K for 6 hours to measure the corrosion rate (the mass decrement per unit area and unit time) in accordance with JIS G 0591:2012. Regarding the evaluation of corrosion resistance, any corrosion rate of less than 1.0 g/m$^2$/h was judged to be "Passed", and any corrosion rate of 1.0 g/m$^2$/h or more was judged to be "Failed". The results are shown in Table 4.

TABLE 4

Measurement results of mechanical properties and corrosion resistance of alloy formed articles FA1 to FA5.

| Alloy formed article | FA1 | FA2 | FA3 | FA4 | FA5 |
| --- | --- | --- | --- | --- | --- |
| Alloy powder | P1 | MP2 | MP3 | MP4 | MP5 |
| Total area ratio of precipitated particles (%) | 20 | 39 | 51 | 33 | 42 |
| Vickers hardness (Hv) | 453 | 512 | 541 | 498 | 539 |
| Converted tensile strength (MPa) | 1429 | 1613 | 1704 | 1570 | 1698 |
| Corrosion rate (g/m$^2$/h) | 0.70 Passed | 0.69 Passed | 0.73 Passed | 0.68 Passed | 0.70 Passed |

As shown in FIG. 4, it is confirmed that each of the alloy formed articles FA2 to FA5 according to the invention has better mechanical properties than those of the conventional alloy formed article FA1 as the reference sample. In addition, it is confirmed that each of the alloy formed articles FA2 to FA5 of the invention has corrosion resistance comparable to that of the conventional alloy formed article FA1.

The above-described embodiments and experimental examples have been specifically given in order to help with understanding on the present invention, but the invention is not limited to the described embodiments and experimental examples. For example, a part of an embodiment may be replaced by known art, or added with known art. That is, a part of an embodiment of the invention may be combined with known art and modified based on known art, as far as no departing from a technical concept of the invention.

LEGEND 10 molten metal;
20 alloy powder;
30 mixed powder;
40 alloy AM article; and
45 alloy formed article.

The invention claimed is:

1. An alloy article, comprising matrix phase crystal grains being equiaxed crystals with an average crystal grain size of 150 μm or less, the alloy article having a metallic composition comprising:
   Co, Cr, Fe, Ni and Ti, each within a range of 5 atomic % or more and 35 atomic % or less;
   Mo within a range of more than 0 atomic % and less than 8 atomic %; and
   a balance comprising inevitable impurities,
   wherein in the matrix phase crystal grains, ultrafine particles with an average particle size of 100 nm or less and oxide particles with an average particle size of 100 nm or less are dispersedly precipitated.

2. The alloy article according to claim 1,
   wherein the metallic composition further comprises one of Y, Nb, Al and V within a range of more than 0 atomic % and 4 atomic % or less, and
   wherein the total amount of the one of Y, Nb, Al and V and the Mo is 8 atomic % or less.

3. The alloy article according to claim 1,
   wherein the oxide particles are particles of an oxide of at least one of Ti, Y, Nb, Al and V, and
   wherein the standard Gibbs energy of formation of the oxide particles is larger in negative number than the standard Gibbs energy of formation of $Fe_3O_4$ at 25° C.

4. The alloy article according to claim 1, wherein the metallic composition comprises:
   the Co within a range of 20 atomic % or more and 35 atomic % or less;
   the Cr within a range of 10 atomic % or more and 25 atomic % or less;
   the Fe within a range of 10 atomic % or more and 25 atomic % or less;
   the Ni within a range of 15 atomic % or more and 30 atomic % or less; and
   the Ti within a range of 5 atomic % or more and 15 atomic % or less.

5. The allay article according to claim 1, wherein the ultrafine particles are crystalline particles in that the Ni and the Ti are concentrated than in the matrix phase crystal grains.

6. The alloy article according to claim 1, wherein the matrix phase crystal grains have a crystal structure of face-centered cubic crystal or a mixture of face-centered cubic crystal and simple cubic crystal.

7. A method for manufacturing the alloy article according to 1, the method comprising:
   a raw material mixing and melting step of mixing and melting raw materials of the metallic composition of claim 1 to form a molten metal;
   an atomization step of forming an alloy powder from the molten metal;
   a mixed powder preparation step of preparing a mixed powder by mixing the alloy powder and a powder of an oxygen atom supply source oxide, wherein the oxygen atom supply source oxide is at least one of $Fe_2O_3$, $Fe_3O_4$, and NiO;
   an additive manufacturing step of forming an alloy formed article having a desired shape from the mixed powder by additive manufacturing; and
   a pseudo-solution heat treatment step of subjecting the alloy formed article to a pseudo-solution heat treatment within a temperature range of 1000° C. or more and 1250° C. or less.

8. The method for manufacturing the alloy article according to claim 7, wherein the pseudo-solution heat treatment step comprises a cooling process of air-cooling, gas-cooling or water-cooling after a holding process within the temperature range.

9. An impeller formed of the alloy article of claim 1.

10. A fluid machine, comprising the impeller according to claim 9.

11. The fluid machine according to claim 10, wherein the fluid machine is a compressor or a pump.

* * * * *